United States Patent [19]
Maruyama et al.

[11] 3,713,793
[45] Jan. 30, 1973

[54] FUEL GAS COMPOSITION

[75] Inventors: Takeji Maruyama, Nishinomiyashi; Tadao Uenae, Osakashi, both of Japan

[73] Assignee: Iwatani & Co., Ltd., Osaka, Japan

[22] Filed: Jan. 13, 1969

[21] Appl. No.: 790,847

[30] Foreign Application Priority Data

June 3, 1968 Japan .................................43/38115
May 4, 1968 Japan .................................43/29962

[52] U.S. Cl. ...............................44/52, 48/197 FM
[51] Int. Cl. ..................................................C101 1/00
[58] Field of Search......................44/52; 48/197 FM

[56] References Cited

UNITED STATES PATENTS

| | | | |
|---|---|---|---|
| 1,405,806 | 2/1922 | Schreiber | 44/52 |
| 1,528,765 | 3/1925 | Harris | 44/52 |
| 1,863,501 | 6/1932 | Roffey | 44/52 |
| 2,626,459 | 1/1953 | Viles | 48/197 FM |

*Primary Examiner*—Daniel E. Wyman
*Assistant Examiner*—Mrs. Y. H. Smith
*Attorney*—Arthur Schwartz

[57] ABSTRACT

A fuel gas composition which comprises essentially a mixture gas of 65–90 volume percent of acetylene and 35–10 volume percent of LP gas, the mixture of gas being dispersed in a high pressure container which is packed with a porous material permeated with a solvent or solvents selected from a group consisting of acetone, toluene and xylene. The composition is found to be safely storable, transportable and usable under high pressure, has relatively constant composition upon withdrawal from storage, and effective in welding or torch cutting.

5 Claims, No Drawings

FUEL GAS COMPOSITION

This invention relates to a composition of matter useful as a fuel gas, and more particularly to a composition which is storable, transportable and usable safely under high pressure, has relatively constant composition upon withdrawal from storage, and is particularly effective in welding or torch cutting operations.

Acetylene gas is the most preferable fuel gas used in welding or flame cutting operations, because desirable high temperature of about 3,000–3,500°C is easily obtained by burning it in the presence of oxygen. However, acetylene gas is very explosive in a vast range of concentrations (about 2.5–81 volume percent in air), and further easily calorificates by its decomposition reaction to carbon and hydrogen under a condition of high temperature and high pressure and the calorification reaction causes the explosion. Therefore, the employment of acetylene gas as a fuel gas involves considerable risks in the storage, working or transportation. In order to avoid these risks, it is well known that acetylene gas is used in a form of dispersing it in a packing medium to stabilize it. But, in such a type, it is restored to the original dangerous conditions when acetylene gas is withdrawn from the packing. Furthermore, when any shocks (e.g., impact, heating, etc.) are given to the packing during the working, storing or transporting period, the explosion of the gas is likely to occur. Thus, the security of acetylene gas is insufficient in the any hitherto known stabilized form for said gas.

Although attempts were made to overcome the foregoing difficulties and other disadvantages, none, as far as we are aware, was entirely successful when carried into practice commercially on an industrial scale.

It has now been discovered that the fuel gas composition, which comprises a mixture of acetylene and LP gas in a specific ratio and said mixture gas is dispersed in a high pressure container packed with a porous material permeated with a solvent, is non-explosive and therefore very safe as a fuel gas when compared with acetylene gas. Furthermore, it has been found that the mixture gas may be withdrawn in a constant concentration of its components, which make it possible to obtain a constant flame temperature. The flame temperature is found also 5 percent up compared with acetylene gas and therefore, the working efficiency of the mixture gas increases 10 percent up compared with acetylene gas.

It is an object of the present invention to provide a safe gas composition in its application, transportation and storage.

Another object of the present invention is to provide a fuel gas composition which may be withdrawn in a constant concentration of the component gases.

The invention also contemplates providing a fuel gas composition which can offer a high and constant temperature flame, and cut faster than acetylene.

It is also the purpose of the invention to provide a low cost fuel gas composition.

Other objects and advantages will become apparent from the following description.

The mixture gas of the present invention consists essentially of a mixture of from about 65 to about 90 percent of acetylene and from about 35 to about 10 percent of LP gas. The LP gas is selected from a group consisting of propylene, propane and butane, and a mixture thereof. Preferred purity of the acetylene is more than 99 percent and the LP gas is desirably more than 90 percent in its purity, but the variety of the concentration in these ranges does not seriously affect the properties of the mixture gas. If less than 65 percent of acetylene is present the concentration of each components varies remarkably during its withdrawal as shown in Examples 3 and 5. When more than 90 percent of acetylene is present, the explosive property of acetylene affects seriously the mixture gas (See; Example 2).

The porous material employed in the present fuel gas composition means the material having numerous holes or clinks wherein the solvent is absorbed, and exemplified as follows; charcoal, calcium silicate, silica gel, cellulose, porous fused alumina, felt, rock wool, diatomaceous earth, etc.

These porous materials are permeated with a solvent or solvents selected from a group consisting from acetone, xylene and toluene. The explosion limit of acetone in air is 2.55–12.8 percent, xylene is 1.0–6.0 percent and toluene 1.27–6.75 percent. The flash point of acetone is −17.8° C, xylene is 27° C and toluene is 4.4 percent. Boiling point of acetone is 56° C, xylene is about 140° C and toluene is 110° C. These properties contribute to the safety, efficiency, flame temperature and workings of the present fuel gas composition. Preferably, the container (which may be constructed of any one of a great number of suitable materials, such as, for example, steel) is charged with the porous material in an amount substantially 100 percent by volume. A conventional method for effecting the above aim would be to charge the container with an aqueous emulsion of, e.g., calcium silicate. Upon evaporation of the water there is created a sponge-like structure within the container, with the voids of such porous material constituting from about 90 to 95 percent of the gross volume thereof.

The fuel gas composition of the present invention is very stable, since the explosion limit of it is extremely suppressed in comparison with that of acetylene as shown in Example 2. For example, the explosion limit of the mixture gas of acetylene 70 percent and propylene 30 percent is decreased to 5 kg/cm$^2$ abs, and that of the mixture gas of acetylene 65 percent and propylene 35 percent is decreased 6 kg/cm$^2$ abs, while that of acetylene 100 percent is 1.4 kg/cm$^2$ abs. Thus, by employing our fuel gas composition, it is realized to avoid the explosion caused by the presence of acetylene. Further, the LP gas which is another component of the present fuel composition, works effectively as a fuel gas in differing from the inactive gases which is usually employed as diluent gas for acetylene.

Prior experience has shown that the compositions of both the gas and the liquid phases stored in a container under pressure vary as gas is withdrawn. A relatively constant gas phase composition is desirable to provide a constant flame temperature in order that welding, cutting, or the like techniques may be conducted over the full period of gas withdrawal from the storage container. Present fuel gas composition is best suited for such purpose, because it has not only a relatively constant composition upon withdrawal from storage, but also is superior to acetylene in non-explosive property, non-back firing property, high temperature, working efficiency, cost, etc.

The solubility of the gas mixture to the solvents and the cubical expansion of the solvents caused by absorption of the gas mixture are practically the same as that of acetylene. Therefore, when the present gas mixture is absorbed under pressure in the high pressure container, the safety space should be constructed as same as that of acetylene gas container.

In use, the fuel gas composition of the present invention may be handled in almost the same manner as conventional gases.

Preferably, the pressure within the container, which is dependent upon ambient temperatures and the amount of fuel gas to be confined therein, falls within the range of from about 5 kg/cm$^2$ to about 30 kg/cm$^2$. Even more preferably, it is about 11 kg/cm$^2$ at an ambient temperature of about 10° C; 13 kg/cm$^2$ at about 20° C; 17 kg/cm$^2$ at about 30° C; and 20 kg/cm$^2$ at about 40° C.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims. Example 1.

Acetylene gas and propylene gas are mixed to obtain various gas mixtures thereof, which mixtures contain acetylene gas in the range of 53.5–100 percent and propylene gas in 14–100 percent. In a high pressure container, a porous material (charcoal mass) is packed and then 1 l of acetone is permeated. While cooling the container by dipping in a water bath of 16–18° C, the mixed gases are filled up therein under pressure of 1.5 kg/cm$^2$ abs at the rate of 450 l/hour (calculated as a volume under the atmospheric pressure), and the dissolution velocity of the gas mixtures and the pressure rise are measured. The results are shown in the following table 1 as compared with the values of acetylene gas.

Table 1

Pressure (kg/cm$^2$ Gauge)

| Mixture Gas C$_2$H$_2$ (%) | C$_3$H$_6$ (%) | 1 hour | 2 hours | 3 hours |
|---|---|---|---|---|
| 100 | 0 | 5.1 | 9.2 | 12 |
| 86.9 | 13.1 | 4.7 | 8.3 | 11.8 |
| 72.1 | 27.9 | 5.5 | 9.1 | 11.3 |
| 55.0 | 45.0 | 5.3 | 8.7 | 10.7 |
| 0 | 100 | 5.5 | 7.6 | 8.6 |

EXAMPLE 2.

The explosion limit of the mixture gas of acetylene and propylene is shown in the Table 2. It is apparent from the Table that the gas mixture is very stable since its explosion limit is extremely suppressed compared with that of acetylene gas.

Table 2

Explosion Limit

| Concentration of acetylene gas (Vol.%) | Total pressure of the mixture gas (kg/cm$^2$ abs) |
|---|---|
| 100 | 1.4 |
| 90 | 2.5 |
| 80 | 3.3 |
| 70 | 4.8 |
| 65 | 6.0 |
| 60 | 8.1 |

EXAMPLE 3.

Various gas mixture compositions of acetylene and propylene are stored into the container (31) in the same manner as in Example 1. Then, while the mixture gas compositions are withdrawn from the container in the rate of 0.2 m$^3$/hour and releasing pressure 0.2 kg/cm$^2$, the inner pressure of the container and gas components are measured throughout the withdrawing period. The results are listed in the following table 3.

TABLE 3

[Propylene gas molar percent in the withdrawn gas]

| Mixture gas compositions (molar percent) | | Inner pressure of container (kg./cm.$^2$ gauge) | | | | | | | | | | | Remarks, °C. |
|---|---|---|---|---|---|---|---|---|---|---|---|---|---|
| C$_3$H$_6$ | C$_2$H$_2$ | 10 | 11 | 9 | 8 | 7 | 6 | 5 | 4 | 3 | 2 | 1 | 0 | |
| 14 | 86 | 12 | 13.8 | 14 | 14 | 14 | 14 | 14 | 14 | 14 | 14 | 14 | 14 | 16–18 |
| 28 | 72 | 24 | 26 | 27 | 28 | 28 | 28 | 28 | 28 | 28 | 28 | 28 | 28 | 13 |
| 35 | 65 | 30 | 32.5 | 34 | 34.5 | 35 | 35 | 25 | 35 | 35 | 35 | 35 | 35 | 13 |
| 46.5 | 53.5 | 33 | 37 | 40 | 42.5 | 43.5 | 44 | 45 | 45 | 44.5 | 44 | 43 | 40 | 16 |

EXAMPLE 4.

A mixture gas composition of acetylene gas 80 percent and propylene gas 20 percent is filled up in a high pressure container (capacity: 3 l) which is packed with calcium silicate and permeated with 1 l of toluene or xylene. The filling up is conducted under pressure of 1.5 kg/cm$^2$ abs at the rate of 450 l/hour (calculated as a volume under the atmospheric pressure), while cooling the container at 16–18° C. Table 4 is the comparative data of the dissolution velocity of the mixture gas and the pressure rise with the commercial acetylene gas dissolved in acetone.

Table 4

Pressure (kg/cm$^2$ Gauge)

| Mixture Gas C$_2$H$_2$ (%) | C$_3$H$_6$ (%) | Solvent | 1 hour | 2 hours | 3 hours |
|---|---|---|---|---|---|
| 100 | 0 | Acetone | 4.5 | 8.8 | 13.0 |
| 72.0 | 28.0 | Xylene | 5.3 | 8.9 | 11.2 |
| 7.0 | 28.0 | Toluene | 5.2 | 8.8 | 11.0 |

EXAMPLE 5.

Propylene gas concentration (molar percent) is measured in the same manner as in Example 3. The result is shown in the following Table 5.

TABLE 5

| Mixture gas composition (molar percent) | | Inner pressure of container (kg./cm.² gauge) | | | | | | | | | | | | Remarks, °C. |
|---|---|---|---|---|---|---|---|---|---|---|---|---|---|---|
| C₃H₆ | C₂H₂ | 11 | 10 | 9 | 8 | 7 | 6 | 5 | 4 | 3 | 2 | 1 | 0 | |
| 13 | 87 | 12 | 12.8 | 13 | 13 | 13 | 13 | 13 | 13 | 13 | 13 | 13 | 13 | 16-18 |
| 27 | 73 | 25 | 26 | 26.5 | 27 | 27 | 27 | 27 | 27 | 27 | 27 | 27 | 27 | 13 |
| 34 | 66 | 30 | 33 | 33.5 | 34 | 34 | 34 | 34 | 34 | 34 | 34 | 34 | 34 | 13 |
| 45 | 55 | 32 | 36 | 40 | 43 | 44 | 44.5 | 45 | 46 | 45 | 44 | 38 | 37 | 16 |

EXAMPLE 6.

The working properties of the fuel composition of Examples 1 and 4 are compared with the commercial acetylene gas dissolved in acetone.

Table 6

| Properties | Acetylene Gas | Mixture Gas |
|---|---|---|
| Explosiveness | Explosive | Non-explosive |
| Back Fire | Fatal | None (Safe) |
| Welding Operation | Good | Good |
| Cutting Operation | Good | Very Good 10% up of working efficiency compared with acetylene gas, fine cutting surface, remarkable decrease of inferior article. |
| Heating | Good | 5% up compared with acetylene gas |
| Hardening | Good | Good |
| Consumption of the fuel gas | Almost the same as each other | |
| Consumption of oxygen | | 5% up compared with acetylene gas |

Having thus disclosed the invention, what is claimed is:

1. A pressurized fuel package for supplying a fuel gas mixture in substantially constant gas proportions comprising: a container packed with a porous material permeated with a solvent selected from the group consisting of acetone, xylene, toluene and mixtures thereof having absorbed therein a gaseous fuel composition consisting essentially of an admixture of from about 65 to 90 volume percent acetylene gas and from about 35 to 10 volume percent of a gas selected from the group consisting of propylene, propane and butene.

2. The fuel package of claim 1 wherein the porous material is selected from the class consisting of charcoal, calcium silicate and silica gel.

3. The fuel package of claim 1 wherein the second gas is propylene.

4. The fuel package of claim 1 wherein the second gas is propane.

5. The fuel package of claim 1 wherein the pressure in the container is in the range of from about 5 kg.cm² to about 30 kg/cm².

* * * * *